United States Patent [19]
Chang

[11] Patent Number: 4,823,449
[45] Date of Patent: Apr. 25, 1989

[54] AUTOMATIC AND CONTINUOUS MECHANISM FOR PROCESSING AND ASSEMBLING VENETIAN BLIND SLATS

[76] Inventor: A-Shen Chang, No. 15-1, Lane 494, Fu Chien Road, Fu Hsin Ts'un, Fu Hsin Hsiang, Changhua Hsien, Taiwan

[21] Appl. No.: 118,224

[22] Filed: Nov. 9, 1987

[51] Int. Cl.[4] .............................................. B23P 19/04
[52] U.S. Cl. .................................... 29/24.5; 29/33 K
[58] Field of Search .................... 29/21.1, 24.5, 243.5, 29/33 K, 33.5, 56.5, 56.6; 72/325; 160/233, 234, 235, 236

[56] References Cited

U.S. PATENT DOCUMENTS 4,420,862 12/1983 Edixhoven .......................... 29/24.5
4,545,100 10/1985 Gaillard et al. ...................... 29/24.5

FOREIGN PATENT DOCUMENTS 8504687 10/1985 PCT Int'l Appl. ................. 29/24.5

*Primary Examiner*—Timothy V. Eley
*Attorney, Agent, or Firm*—Browdy & Neimark

[57] ABSTRACT

The present disclosure is directed to an automatic and continuous mechanism for processing and assembling blind slats, which includes a first stage slats feeding unit, a second stage length setting and perforating unit, and a third stage of cord fixing unit. All three of the units are arranged consecutively, one after the other, so that slats can be transferred one by one and processed and automatically assembled onto a number of stair-like ropes and fixed thereon in the end without human intervention.

3 Claims, 6 Drawing Sheets

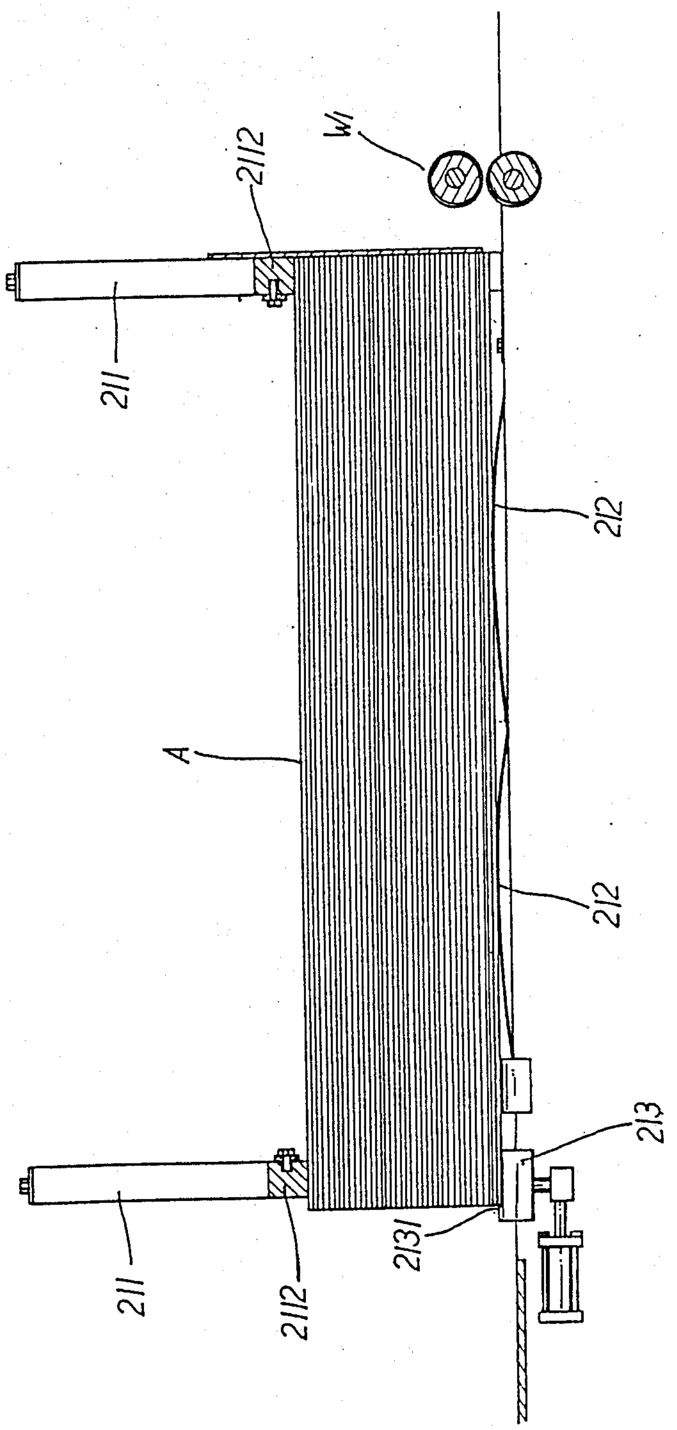
FIG. 2-A

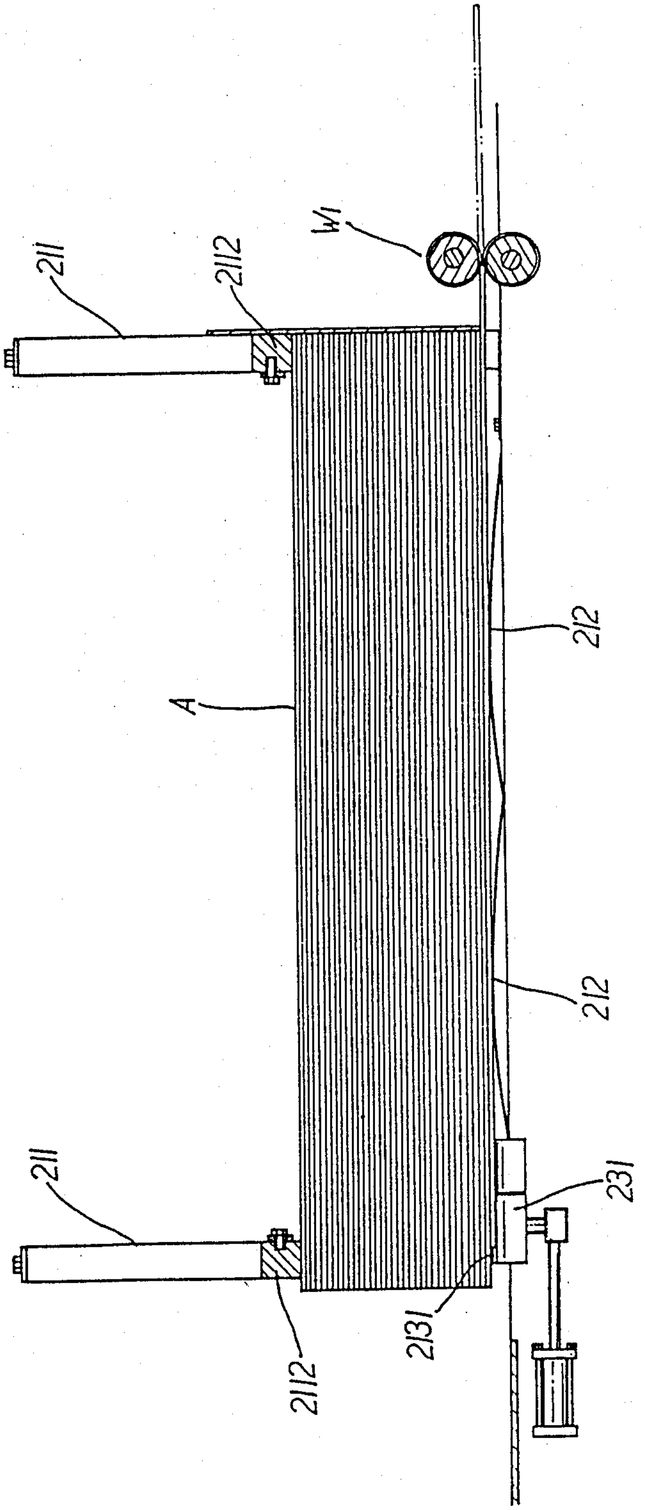
FIG. 2·B

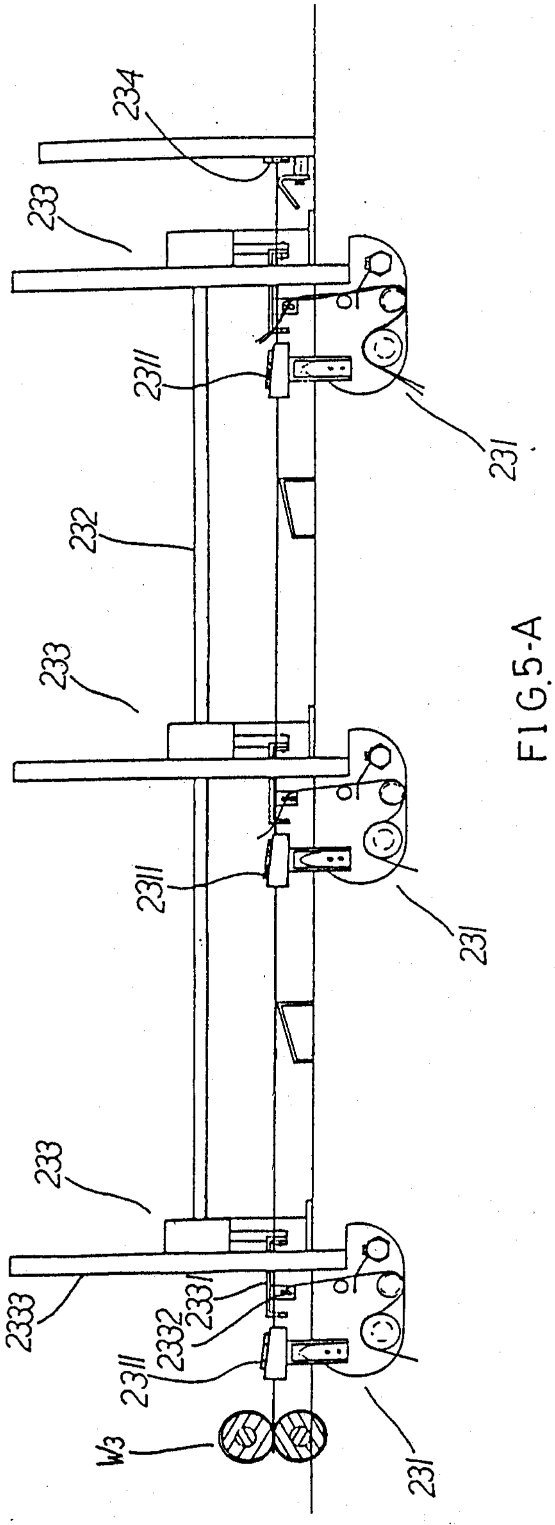
FIG.5-A
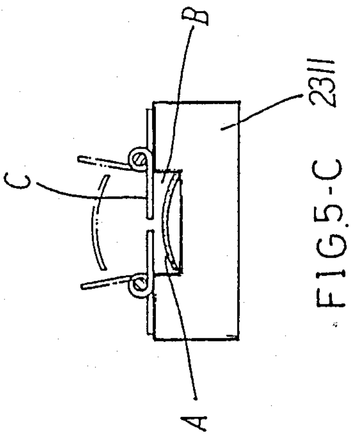
FIG.5-C
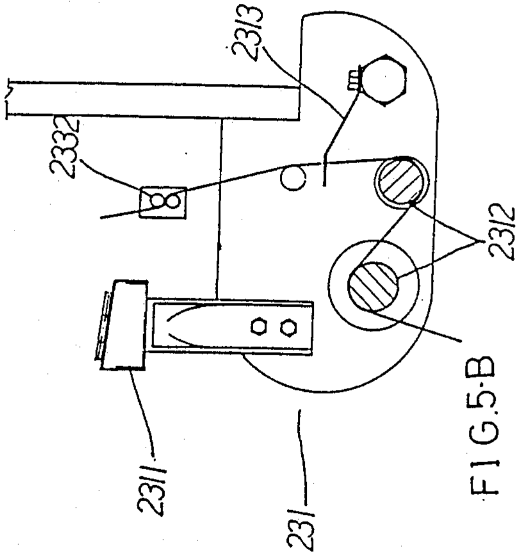
FIG.5-B

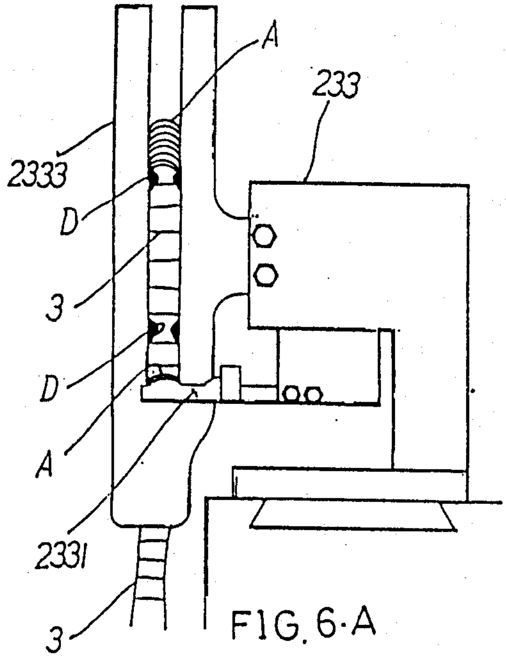
FIG. 6-A
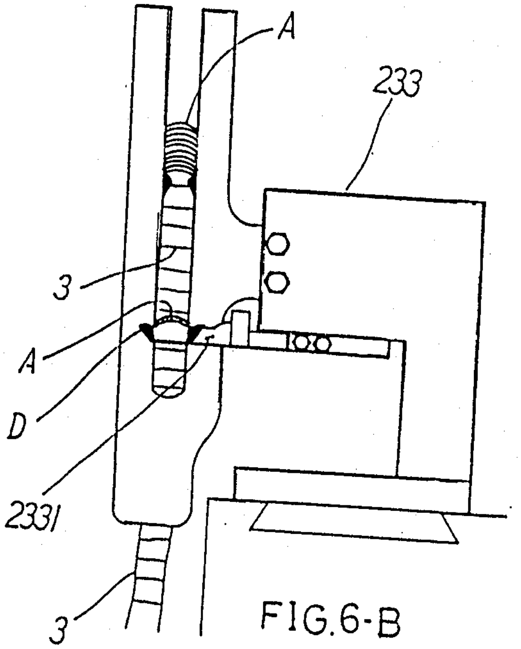
FIG. 6-B
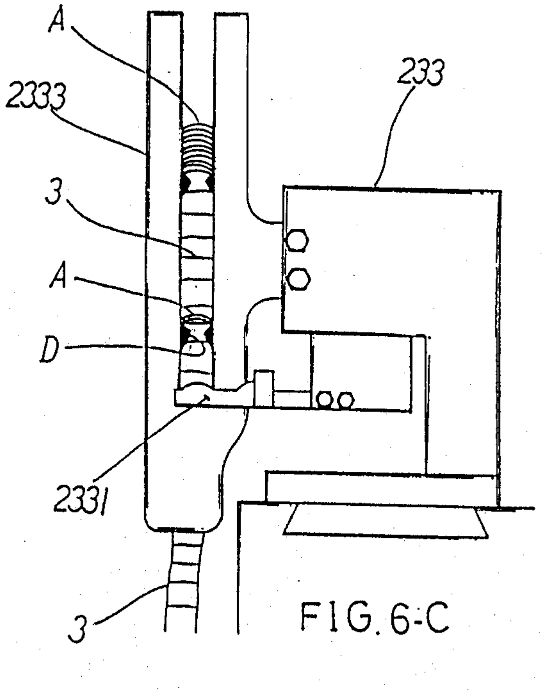
FIG. 6-C

AUTOMATIC AND CONTINUOUS MECHANISM FOR PROCESSING AND ASSEMBLING VENETIAN BLIND SLATS

SUMMARY OF THE INVENTION

The present invention is an improved or modified type of the prior art of the present inventor, U.S. Pat. No. 4,615,087, granted on Oct. 7, 1986, which performs three stages of operation whereby oblong blind slats, piled up in a stack, are pushed forward in a first stage unit, one by one, from the bottom of the stack, and fed into a second stage length-setting and perforating unit where said slats are cut into proper size and perforated one after the other. Then the processed slats are further delivered by rolling rollers to a third stage unit where each slat is guided through the opening spaces of a number of stair-like ropes which are consecutively, spacedly and vertically arranged. In the meanwhile, three continuous ropes are automatically led upward in a step by step manner at three different positions, and all the finished slats are piled up one by one in a stack with three portion of the slats movably held in three vertical slots so as to continuously perform the assembling process.

Generally speaking, blind slats are processed by a large amount of manual labor, especially in assembling them into operative manner. Several working departments are conventionally organized to deal with the processing of the slats at each stage, and the transfer of these slats among departments has unavoidably slowed down the processing speed as a result of artificial mistakes and inefficiency, thus leading to an uncontrollable quality of the products.

Therefore the primary object of the present invention is to provide an improved automatic and continuous mechanism for processing and assembling blind slats, which can perform the feed of elongated slats one by one and can cut the fed slats into proper size and perforate the same in the meanwhile, and mount the processed slats onto a number of stair-like ropes at the last stage of assembly so as to totally eliminate human intervention in the producing of venetian blinds with high quality and good efficiency.

One further object of the present invention is to provide an improved automatic and continuous mechanism for processing and assembling blind slats, which is of compact size and arranged in consecutive manner for the facility of automatic operation and saving of space in installation.

In order to clearly illustrate the mechanical structure and operation modes of the present invention, a number of drawings are shown along with the reference to the detailed description of the preferred embodiment of the present invention, in which:

BRIEF DESCRIPTION OF THE DRAWINGS

FIG. 2A is a diagram showing the elongated slats being piled up in a stack in the first stage feed unit;

FIG. 2B is a diagram showing how the bottommost slat of a stack being pushed forward by a cylinder, thereby the other end of the slat can be engaged with rolling rollers for effecting feed purpose;

FIG. 5A is a diagram showing the structure .of the third stage cord fixing unit;

FIG. 5B is an enlarged diagram of one part of FIG. 5A structure of the cord guiding mechanism of the present invention;

FIG. 5C is a diagram showing the detailed structure of the top guide groove of an upright supporting post;

FIG. 6A is a diagram showing the first step of a slat being guided through a stair-like rope assembly before it is lifted upward by a lifter device;

.FIG. 6B is a diagram showing the slat in FIG. 6A being raised up by the lifter device and going through a pair of pushed-aside stop members;

FIG. 6C is a diagram showing the slat gone through the stop members with said lifter device resuming its original operative position.

DETAILED DESCRIPTION OF THE PREFERRED EMBODIMENT

Figure 1:
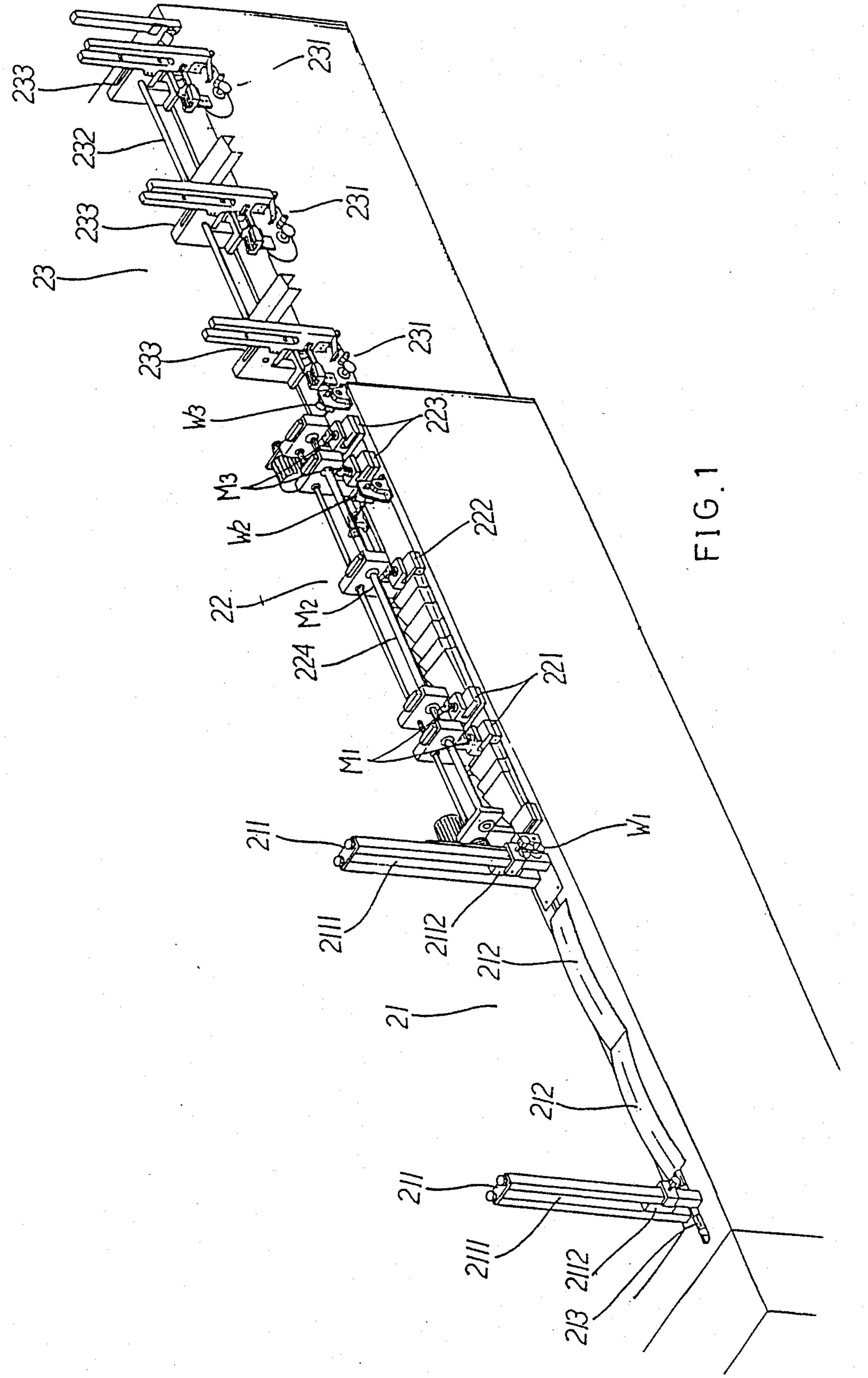
FIG. 1 is a diagram showing the overall structure of the present invention.

Referring first to FIG. 1, an automatic slat processing and assembling apparatus 2 for manufacturing venetian blinds consists of a first-stage feed unit 21, a second-stage length-setting and perforating unit 22 and a third-stage cord fixing unit 23, that are continuously and integrally disposed in sequence so that the whole process of assembly can be performed in a consecutive manner.

Said first-stage feed unit 21 is provided with a pair of upright guide members 211 disposed symmetrically at each end thereof. Each guide member 211 is made up of two vertical parallel rods having a square cross section with a slot 2111 forming therebetween for the accommodation of the end of a stack of slats as shown in FIG. 2A. Along the slot 2111 is disposed a slidable weight 2112 which is pressingly located on the top of each end of the stack of slats in operation and is free to move downward as long as the height of the stack is reduced as a result of the continuous delivery of said slats A to the second stage unit 22 and the weight of the press weight. A pair of arcuately raised portions 212 are disposed on the bottom defined between the two upright guide members 211 for supporting the middle portion of a delivering slat. A cylinder-actuated delivery block 213 is located under the front guide member 211, and on the left end of said delivery block 213 is defined a raised shoulder 2131 for engagement with the edge of a slat A. A pair of oppositely disposed rollers W1 are located just next to said right guide member 211 and in the reach of the delivered slat A so that the slat A can be further transmitted to the second stage unit 22 by the rolling of the paired rollers W1, as shown in FIG. 2B.

Figure 3:
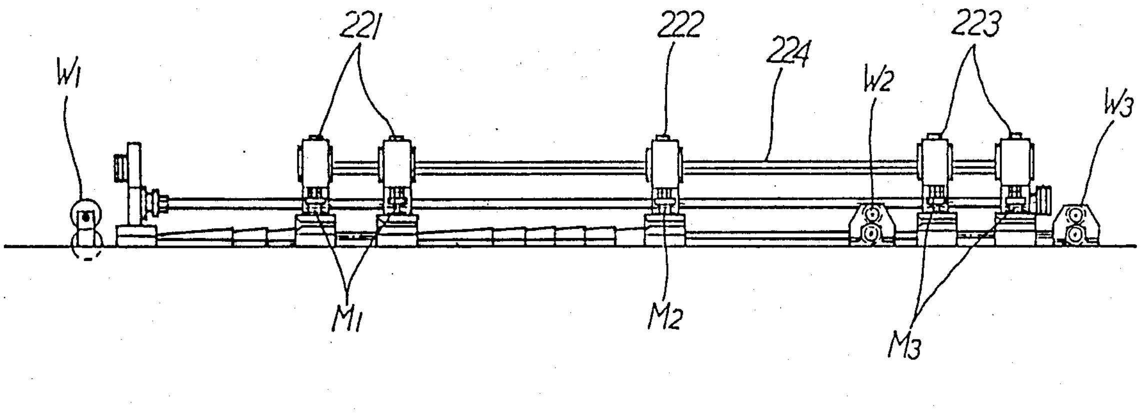
FIG. 3 is a side elevation view showing the structure of the second stage length setting and perforating unit.

Referring further to FIG. 3, the slat A is continuously delivered by means of said rollers W1 to the second stage unit 22 for effecting the length setting and perforating operation.

Figure 4:
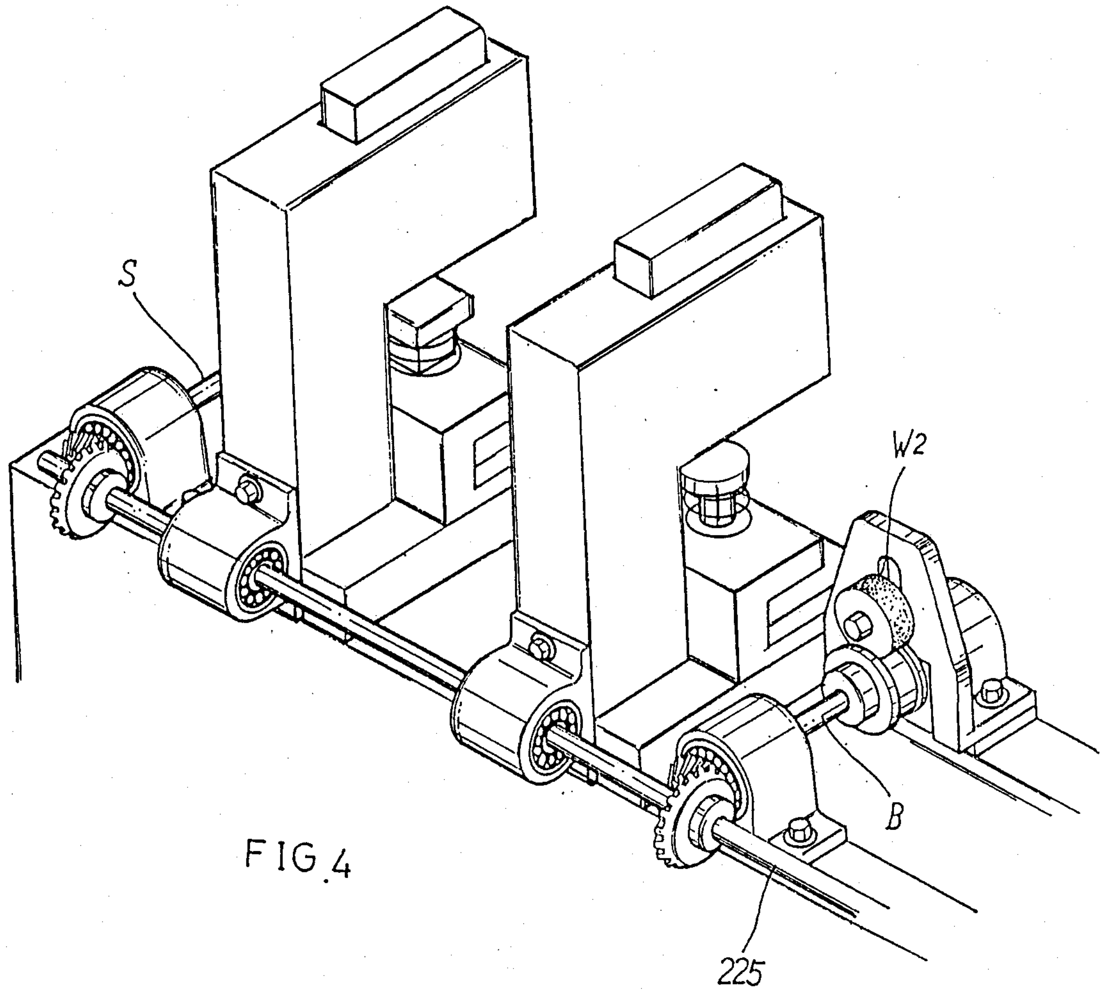
FIG. 4 is a perspective view showing the synchronously operated rolling rollers of the present invention.

Three sets of cutting device 221, 222 and 223 are spacedly located in the second stage unit 22, and are operatively connected by an elongated drive axle 224 which can synchronously actuate the ram members M1, M2 and M3 of said cutting device 221, 222, 223 to operate. Said cutting devices 221, 222 are movable by means of a worm so to change the space therebetween for accommodating slats of different size therebetween. Said cutting device 223 are fixed in place with rolling rollers W2 located in front thereof for continuously delivering said slat A forward. The forward moving slat A will actuate a sensor means (infrared indicator or limiting switch) at a particular position after going into said cutting device 223, which then instructs said drive axle 224 to move said ram members downward to cut said slat A into proper form and simultaneously to perforate thereon. The processed slat A is then forward delivered by rolling rollers W2 to the rolling rollers W3. The rolling rollers W1, W2, W3 are structured in the same manner and operatively associated with each other by an elongated shaft 225 which is provided with a corresponding number of bevel gears thereon which are engaged respectively with those bevel gears on the laterally disposed shafts S of said roller sets W1, W2, W3 as shown in FIG. 4 so that the same can be operated in synchronism.

As shown in FIG. 5A, the final stage of cord fixing unit mainly consists of three sets of spacedly-located, upright cord fixing devices 231 each of which is provided with a vertically hung removable stair-like rope assembly 3, and a lifter means 233 upward and downward movable in synchronism by means of an elongated driving rod 232, and a limit switch 234, adopted to control the motion of said slat A, is mounted at the end of said cord fixing devices 23.

Each of the cord fixing devices 231 includes an upright post with a horizontally located supporting member 2311 having a horizontal groove B extending the whole length thereof for the passage of a slat A. Over the top of the groove B is disposed an upward pivotable cover C (as shown in FIG. 5C).

A pair of cylindrical rope guide rollers 2312 are provided for smooth transfer of the stair-like rope assembly 3 upward which is further led through a resilient control plate 2313 serving to limit the stair-like rope assembly to move step by step one at a time (as shown in FIG. 5B). Said driving rod 232 is used to periodically actuate a support frame 2331 of said lifter member 233 is structured in U-shaped configuration with its two ends extending beyond the upright accumulation post 2333. A rolling roller means 2332 is screwed under said U-shaped support frame 2331, extends outwardly and is located just above said cord fixing device 231 for delivering said stair-like rope assembly.

In normal operation, a slat A, leaving the second stage length setting and perforating means, is further delivered, by the rolling rollers W3, into said third stage cord fixing means. Said slat A is first led through the said groove B of said supporting member 2311, then moves through the front end of said support frame 2331, through the opening between the rungs of the stair-like rope assembly, and further through the vertical slot of said upright accumulation post 2333. This movement is repeated as the slat moves on through the three sets of said cord fixing devices until the front tip of said slat A touches said limit switch 234. The movement comes to an end thereby as shown in FIG. 5A. At this moment, said driving rod 232 is actuated to simultaneously lift up all said support frames 2331 of the lifter members 233, thus disengaging slat A to disengage from the restraint of said horizontal supporting member 2311 and popping up accordingly as shown in FIG. C. The lifted slat can push a pair of limit blocks D aside as shown in FIG. 6B so to permit said slat A pile up one by one, and the limit blocks D resume their original positions as said support frame 2331 moves downward as shown in FIG. 6C. Along with the lifting of said support frame 2331, said rolling rollers 2332 can bring said stair-like rope assembly to move up one step in a restraint manner with the help of said resilient plate 2313, insuring that the slat will through each opening between the rungs of said stair-like rope assembly one at a time.

What is claimed is:

1. An automatic and continuous mechanism for processing and assembling blind slats comprising a first stage feed means;

a second stage length setting and perforating station which receives a venetian blind slat from said first stage feed means; and for cutting the slat into a predetermined size and, at the same time, effecting the perforation of said slat; and a third stage cord fixing station which receives said slat removed from said length setting and perforating station;

said first stage feed means, said second stage length setting and perforating station and said third stage cord fixing station being arranged in a rectilinear consecutive manner for delivering stacks of elongated venetian blind slats one by one to said length setting and perforating means;

wherein said first stage feed means includes a pair of rearward and forward upright guide members spacedly located at rearward and forward ends of said feed means, each guide member having an elongated slot disposed thereon for accommodation of forward and rearward ends of a stack of slats, with an adjustable press weight slidable located between said guide members for pressing on top of said stack in operation, and a cylinder-actuated delivery block, disposed under the rearward guide member, for moving a bottommost slat in said stack forward in operation by pushing the rearward end thereof, a first pair of rolling rollers being disposed at the forward end of said feed means, just next to the forward guide member so that the pushed slat can be further pulled forward by said first pair of rolling rollers to move into said second stage length setting and perforating station continuously in operation;

said second stage length setting and perforating station including three sets of cutting devices, each having a ram head, spacedly located and synchronously operated by means of a drive axle so to enable the ram heads of said cutting devices to punch on said slat simultaneously, the distance between said cutting devices being adjustable; second and third pairs of rolling rollers being disposed just rearward and forward of the forward most cutting device, respectively, for effecting continuous transfer of the slat to the said third stage cord fixing station;

said third stage cord fixing station comprising three sets of upright cord fixing units spacedly located, each with a vertically hung stair chair rope assembly attached thereon, means for feeding said slat into rings of said stair chain rope assembly and three sets of lifter means synchronously operated by a driving rod, and a limiting switch means disposed at a forward end of the cord fixing station for controlling the operation of feeding in and lifting up of the slat, whereby each assembled slat may be raised one by one and accumulated in a stack.

2. An improved automatic and continuous mechanism for processing and assembling blind slats as set forth in claim 1, wherein each of said cord fixing units comprises an upright post having a horizontally located supporting member disposed on a top end thereof with an elongated groove disposed thereon for the passage of a slat, said rope assembly being releasably held by fourth rolling rollers means, limited to stepwise movement by a resilient plate, so that said slat can be guided through an opening between rungs of the stair chain rope assembly one at a time.

3. An improved automatic and continuous mechanism for processing and assembling blind slats as set forth in claim 2, wherein said lifter means includes a vertical accumulating post, having a vertical slot therein, opposite of said upright post with respect to said supporting member disposed on top of said upright post; a pivotable limit block disposed on each wall of the vertical slot of said accumulation post; an upwardly and downwardly movable support frame, attached under said lifter means, laterally disposed with respect to and at the lower end of said vertical accumulating post with said fourth rolling rollers means screwed thereunder, whereby, when said support frame is lifted up, said stair chain rope assembly is brought one step upward with the help of said resilient plate, and the slat is simultaneously lifted up, pushing aside said limit blocks, and then stopped by the same, thus piling up assembled slats.

* * * * *